(12) United States Patent
Yabugaki et al.

(10) Patent No.: US 10,473,909 B2
(45) Date of Patent: Nov. 12, 2019

(54) MICROSCOPE SYSTEM HAVING TOUCH PANEL AND ELECTRONIC STAGE DRIVING AMOUNT BASED ON PRESSURE DETECTION

(71) Applicant: OLYMPUS CORPORATION, Hachioji-shi, Tokyo (JP)

(72) Inventors: Hiroyuki Yabugaki, Hachioji (JP); Yasunari Matsukawa, Saitama (JP); Tetsuya Shirota, Hachioji (JP)

(73) Assignee: OLYMPUS CORPORATION, Tokyo (JP)

(*) Notice: Subject to any disclaimer, the term of this patent is extended or adjusted under 35 U.S.C. 154(b) by 0 days.

(21) Appl. No.: 15/861,333

(22) Filed: Jan. 3, 2018

(65) Prior Publication Data
US 2018/0196248 A1 Jul. 12, 2018

(30) Foreign Application Priority Data
Jan. 6, 2017 (JP) .................. 2017-001095

(51) Int. Cl.
G01B 21/24 (2006.01)
G02B 21/36 (2006.01)
(Continued)

(52) U.S. Cl.
CPC ........... *G02B 21/367* (2013.01); *G02B 21/24* (2013.01); *G02B 21/362* (2013.01);
(Continued)

(58) Field of Classification Search
CPC ....... G02B 21/00–368; G06F 3/03545–03547; G06F 3/041–04897;
(Continued)

(56) References Cited

U.S. PATENT DOCUMENTS 10,018,823 B2 * 7/2018 Jockusch ............. G02B 21/365
2013/0038931 A1 * 2/2013 Shirota .................. G02B 21/26
359/392
(Continued)

FOREIGN PATENT DOCUMENTS

JP 5649851 B2 1/2015
WO WO-2016188215 A1 * 12/2016 ............ G06F 3/041

Primary Examiner — Kimberly N. Kakalec
Assistant Examiner — Ryan S Dunning
(74) Attorney, Agent, or Firm — Holtz, Holtz & Volek PC

(57) ABSTRACT

A microscope system includes: an microscope provided with electronic units; a display configured to display operation information; a touch panel configured to detect a position of contact of an object from outside; a setting unit configured to set areas corresponding respectively to multiple operation functions in a detection area of the touch panel; a pressure detector configured to detect a value of a pressure applied in the position of contact; and a drive controller configured to generate, based on the position of contact that is detected by the touch panel, the number of positions of contact, a change of the position of contact over time, and the value of the pressure detected by the pressure detector, an instruction signal of an instruction to change an observation status in which the specimen is observed with the electronic unit corresponding to operation function that is set by the setting unit.

6 Claims, 14 Drawing Sheets

(51) Int. Cl.
　　　*G06F 3/041*　　　(2006.01)
　　　*G02B 21/24*　　　(2006.01)
　　　*G06F 3/0488*　　(2013.01)
　　　*G02B 21/26*　　　(2006.01)

(52) U.S. Cl.
　　　CPC .......... *G06F 3/0412* (2013.01); *G06F 3/0416* (2013.01); *G06F 3/0488* (2013.01); *G02B 21/26* (2013.01); *G02B 21/368* (2013.01); *G06F 2203/04105* (2013.01)

(58) Field of Classification Search
　　　CPC .......... G06F 2203/041–04113; H01L 27/3225; H01L 27/323; H04N 1/00411; H04N 5/23216; H04N 5/232933; H04N 2005/443; H04N 21/42224
　　　USPC .................. 345/173–178; 348/14.03, 79, 80; 359/368–398; 399/185; D14/318, 389, D14/150
　　　See application file for complete search history.

(56) References Cited

U.S. PATENT DOCUMENTS

2014/0063226 A1\*　3/2014　Kawata .................. G02B 21/36
　　　　　　　　　　　　　　　　　　　　　　348/80
2014/0362039 A1\*　12/2014　Iwamura ............... G06F 3/0416
　　　　　　　　　　　　　　　　　　　　　　345/174
2018/0348946 A1\*　12/2018　Hao ........................ G06F 3/041

\* cited by examiner

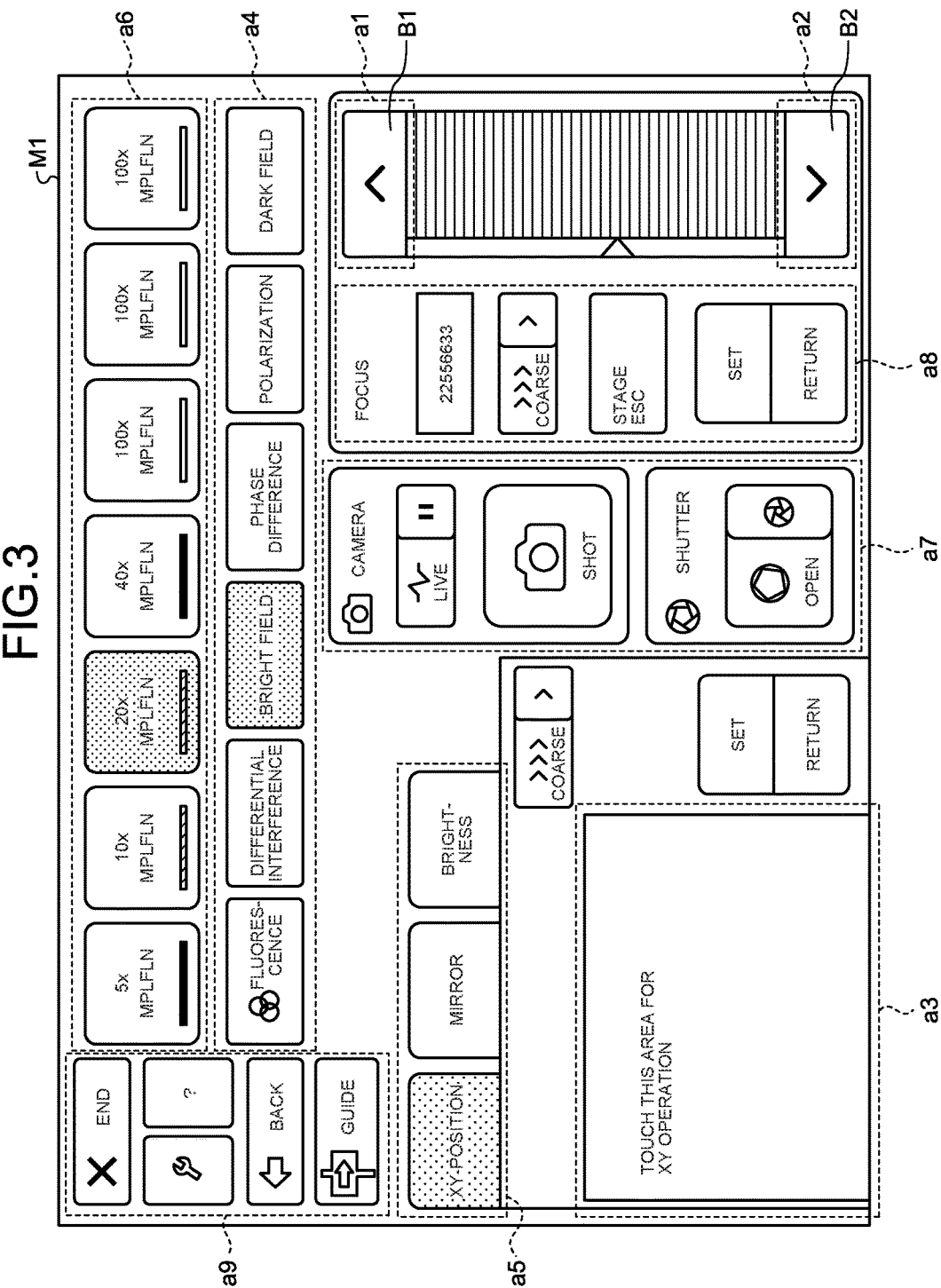

FIG.4A

| ACTION | ACTION TAKEN WHEN MINUS DIRECTION BUTTON IS PRESSED | | ACTION TAKEN WHEN PLUS DIRECTION BUTTON IS PRESSED | |
|---|---|---|---|---|
| | PRESSURE ≥ THRESHOLD | PRESSURE < THRESHOLD | PRESSURE ≥ THRESHOLD | PRESSURE < THRESHOLD |
| CONTROLLING ALIGNMENT UNIT Z COORDINATE | LOWERING (HIGH MOVING SPEED) | LOWERING (LOW MOVING SPEED) | ELEVATING (HIGH MOVING SPEED) | LOWERING (LOW MOVING SPEED) |
| CONTROLLING ALIGNMENT UNIT Z POSITION AND STAGE XY POSITION | MOVING IN MINUS DIRECTION | BRAKING | MOVING IN PLUS DIRECTION | BRAKING |
| CONTROLLING LIGHT SOURCE VOLTAGE | VOLTAGE DOWN (LARGE AMOUNT OF ADJUSTMENT) | VOLTAGE DOWN (SMALL AMOUNT OF ADJUSTMENT) | VOLTAGE UP (LARGE AMOUNT OF ADJUSTMENT) | VOLTAGE UP (SMALL AMOUNT OF ADJUSTMENT) |
| ADJUSTING POLARIZATION AND RETARDATION | ROTATING IN MINUS DIRECTION (LARGE AMOUNT OF ADJUSTMENT) | ROTATING IN MINUS DIRECTION (SMALL AMOUNT OF ADJUSTMENT) | ROTATING IN PLUS DIRECTION (LARGE AMOUNT OF ADJUSTMENT) | ROTATING IN PLUS DIRECTION (SMALL AMOUNT OF ADJUSTMENT) |
| ADJUSTING LASER POWER | REDUCING LASER POWER (LARGE AMOUNT OF ADJUSTMENT) | REDUCING LASER POWER (SMALL AMOUNT OF ADJUSTMENT) | INCREASING LASER POWER (LARGE AMOUNT OF ADJUSTMENT) | INCREASING LASER POWER (SMALL AMOUNT OF ADJUSTMENT) |
| ADJUSTING ELECTRONIC CORRECTION COLLAR | ROTATING IN MINUS DIRECTION (LARGE AMOUNT OF ADJUSTMENT) | ROTATING IN MINUS DIRECTION (SMALL AMOUNT OF ADJUSTMENT) | ROTATING IN PLUS DIRECTION (LARGE AMOUNT OF ADJUSTMENT) | ROTATING IN PLUS DIRECTION (SMALL AMOUNT OF ADJUSTMENT) |
| CONTROLLING AF DEVICE | SETTING MINUS AF OFFSET AMOUNT | ENABLING AF | SETTING PLUS AF OFFSET AMOUNT | ENABLING AF |

FIG.4B

| ACTION | ACTION TAKEN WHEN BUTTON IS PRESSED | |
|---|---|---|
| | PRESSURE ≥ THRESHOLD | PRESSURE < THRESHOLD |
| CONTROLLING AF DEVICE AND IMAGING DEVICE | IMAGING | ENABLING AF |
| CONTROLLING AF DEVICE AND IMAGING DEVICE | DISPLAYING IMAGING MENU | ENABLING AF |
| PUSHING XY OPERATION PAD TO SWITCH TO SETTING SCREEN FOR SPEED, LIMIT, etc. | DISPLAYING STAGE MOVING SETTING SCREEN | MOVING STAGE IN X AND Y DIRECTIONS |
| LIGHTLY PRESSING TO SWITCH TO PREVIEW FOR DIGITAL ZOOM, etc., AND STRONGLY PRESSING TO SWITCH TO ACTUAL OBJECT | SWITCHING BETWEEN OBJECTIVE LENSES | DISPLAYING PREVIEW |
| REPRODUCING OBSERVATION CONDITION ON IMAGE CAPTURED IN THE PAST | SETTING OBSERVATION CONDITION | SELECTING SCREEN/ OPERATING IMAGE |
| TAPPING EDGE OF SCREEN TO MOVE BY GIVEN AMOUNT IN THAT DIRECTION AND STRONGLY TAPPING FOR SEQUENTIAL VIEWS | MOVING STAGE (LARGE MOVING AMOUNT) | MOVING STAGE (SMALL MOVING AMOUNT) |
| CHANGING MICROSCOPE CONTROLLER SCREEN BRIGHTNESS AND SWITCHING BETWEEN LIGHTING ON AND OFF | INCREASING SCREEN BRIGHTNESS | REDUCING SCREEN BRIGHTNESS |
| SETTING LASER OUTPUT | INCREASING LASER OUTPUT | REDUCING LASER OUTPUT |
| ILLUMINATION PATTERN AND PROJECTION DIRECTION | SWITCHING BETWEEN LIGHTING ON AND OFF | CHANGING LIGHTING PATTERN |
| ADJUSTING LIGHT SOURCE LIGHT AMOUNT | LIGHT AMOUNT MAX | LIGHTING OFF |

FIG.4C

| ACTION | ACTION TAKEN WHEN BUTTON IS PRESSED | |
|---|---|---|
| | PRESSURE ≥ THRESHOLD | PRESSURE < THRESHOLD |
| DISPLAYING OBSERVATION METHOD AND OBSERVATION CONDITION SETTING SCREEN | DISPLAYING SETTING SCREEN | CHOOSING ITEM |
| CONTROLLING REPRODUCTION OF TIME LAPSE OBSERVATION IMAGE | FAST-FORWARDING | SWITCHING BETWEEN REPRODUCTION AND STOP |
| SETTING TIME LAPSE OBSERVATION IMAGE REPRODUCTION CONDITION | DISPLAYING SETTING SCREEN | CHOOSING ITEM |
| DISPLAYING SETTING SCREEN FOR LASER ILLUMINATION CONDITION (SUCH AS ILLUMINATION TIME, WAVELENGTH, STIMULATION ORDER) | DISPLAYING SETTING SCREEN | CHOOSING ITEM |
| PUSHING ICON ON OPERATION SCREEN TO DISPLAY HELP | DISPLAYING HELP | CHOOSING ITEM |
| DISPLAYING OBJECTIVE LENS PROPERTIES AND SWITCHING BETWEEN SETTING SCREENS ON OBJECTIVE LENSES | DISPLAYING SETTING SCREEN | DISPLAYING PROPERTIES OF OBJECTIVE LENSES |
| OPERATING PINCH-IN/ PINCH-OUT OF IMAGE | PINCH-IN | PINCH-OUT |
| SETTING OBSERVATION CONDITION ON CONTAINER, GLASS THICKNESS, etc. | DISPLAYING SETTING SCREEN | CHOOSING ITEM |
| STRONGLY PRESSING ONCE TO ENABLE INPUT TO PREVENT ERRONEOUS ACTION | ENABLING OPERATION | DISABLING OPERATION |

FIG.7

| ACTION | ACTION TAKEN WHEN BUTTON IS PRESSED | |
| --- | --- | --- |
| | PRESSURE ≥ THRESHOLD | PRESSURE < THRESHOLD |
| DRIVING STAGE IN X AND Y DIRECTIONS | DRIVING STAGE (FOR COARSE MOVE), FOLLOWING DRAGGING | DRIVING STAGE (FOR FINE MOVE), FOLLOWING DRAGGING |
| DRIVING STAGE IN X AND Y DIRECTIONS | DRIVING STAGE (FOR COARSE MOVE) IN DRAGGING DIRECTION | DRIVING STAGE (FOR FINE MOVE) IN DRAGGING DIRECTION |
| SPECIFYING AREA TO BE STIMULATED BY LASER AND EXECUTING STIMULATING | EXECUTING LASER STIMULATION | DRAGGING TO SET AREA TO BE STIMULATED BY LASER |
| MOVING STAGE AND SPECIFYING SITE TO BE IMAGED | SPECIFYING SITE TO BE IMAGED | DRIVING STAGE, FOLLOWING DRAGGING |
| SPECIFYING AF TARGET AREA AND EXECUTING AF | EXECUTING AF | DRAGGING TO SET AF AREA |

| ACTION | ACTION TAKEN WHEN BUTTON IS PRESSED T20 | |
|---|---|---|
| | PRESSURE IN POINT $\alpha \geq$ PRESSURE IN POINT $\beta$ | PRESSURE IN POINT $\alpha <$ PRESSURE IN POINT $\beta$ |
| CONTROLLING STAGE IN Z DIRECTION | ELEVATING STAGE | LOWER STAGE |

FIG.11

| ACTION | ACTION TAKEN WHEN BUTTON IS PRESSED | |
|---|---|---|
| | PRESSURE ≥ THRESHOLD | PRESSURE < THRESHOLD |
| CONTROLLING STAGE IN Z DIRECTION | MOVING STAGE COARSELY IN Z DIRECTION AND DOWNWARDLY PERFORIMNG TOUCH OPERATIONS IN TWO POINTS WHERE LEFT-SIDE TOUCH OPERATION OF TOUCH OPERATIONS IS BEING FIXED AND RIGHT-SIDE TOUCH OPERATION OF TOUCH OPERATIONS IS UP-DOWN DRAGGING, THEREBY MOVING STAGE COARSELY IN Z DIRECTION ACCORDING TO PRESSURE APPLIED BY DRAGGING | MOVING STAGE FINELY IN Z DIRECTION AND DOWNWARDLY PERFORIMNG TOUCH OPERATIONS IN TWO POINTS WHERE LEFT-SIDE TOUCH OPERATION OF TOUCH OPERATIONS IS BEING FIXED AND RIGHT-SIDE TOUCH OPERATION OF TOUCH OPERATIONS IS UP-DOWN DRAGGING, THEREBY MOVING STAGE FINELY IN Z DIRECTION ACCORDING TO PRESSURE APPLIED BY DRAGGING |
| ADJUSTING FOR COARSE OR FINE MOVE OF PINCH-IN (OUT) OF IMAGE | PINCH-IN (OUT) (COARSE MOVE) | PINCH-IN (OUT) (FINE MOVE) |

T30

MICROSCOPE SYSTEM HAVING TOUCH PANEL AND ELECTRONIC STAGE DRIVING AMOUNT BASED ON PRESSURE DETECTION

CROSS-REFERENCE TO RELATED APPLICATIONS

This application is based upon and claims the benefit of priority from Japanese Patent Application. No. 2017-001095, filed on Jan. 6, 2017, the entire contents of which are incorporated herein by reference.

BACKGROUND

1. Technical Field

The disclosure relates to a microscope system to observe a specimen that is placed on a stage.

2. Related Art

In the related art, a technology in which a microscope controller that performs operations for controlling actions of an electronic unit in a microscope system is provided with a touch panel and a user is able to perform operations on the actions of the electronic unit on the touch panel (see Japanese Patent No. 5649851) has been known. This technology determines the mode of action of the electronic unit according to the number of input points in each of which an input is made by physical contact from outside that is detected by the touch panel and according to the mode in which the input point moves and controls the actions of the electronic unit according to the determined mode of action.

SUMMARY

In some embodiments, a microscope system includes: an microscope provided with a plurality of electronic units and configured to drive each of the electronic units to observe a specimen; a display configured to display operation information for driving each of the electronic units; a touch panel superimposed on a display area of the display and configured to detect a position of contact of an object from outside and receive an input of a position signal corresponding to the position of contact; a setting unit configured to set areas corresponding respectively to multiple operation functions for driving the electronic units in an allocated manner in a detection area of the touch panel; a pressure detector provided between the display and the touch panel and configured to detect a value of a pressure applied in the position of contact when the object contacts the touch panel; and a drive controller configured to: generate, based on the position of contact that is detected by the touch panel, the number of positions of contact, a change of the position of contact over time, and the value of the pressure detected by the pressure detector, an instruction signal of an instruction to change an observation status in which the specimen is observed with the electronic unit corresponding to operation function that is set by the setting unit; and output the instruction signal to the microscope.

The above and other features, advantages and technical and industrial significance of this disclosure will be better understood by reading the following detailed description of presently preferred embodiments of the disclosure, when considered in connection with the accompanying drawings.

BRIEF DESCRIPTION OF THE DRAWINGS

FIG. 3 is a diagram schematically illustrating an exemplary operation screen that is displayed by a display of the microscope controller according to the first embodiment of the disclosure;

FIG. 4A is a diagram illustrating exemplary action information that is recorded in a memory of the microscope controller according to the first embodiment of the disclosure;

FIG. 4B is a diagram illustrating exemplary other action information that is recorded in the memory of the microscope controller according to the first embodiment of the disclosure;

FIG. 4C is a diagram illustrating exemplary still other action information that is recorded in the memory of the microscope controller according to the first embodiment of the disclosure;

FIG. 7 is a diagram illustrating exemplary action information that is recorded in a memory of a microscope controller according to the second embodiment of the disclosure;

FIG. 9 is a diagram illustrating exemplary action information that is recorded in a memory of a microscope controller according to a third embodiment of the disclosure;

FIG. 11 is a diagram illustrating exemplary action information that is recorded in a memory of a microscope controller according to a fourth embodiment of the disclosure.

DETAILED DESCRIPTION

Modes for carrying out the disclosure will be described in detail below with reference to the accompanying drawings. The following embodiments do not limit the disclosure. Furthermore, each of the drawings to be referred to for the descriptions given below only schematically illustrates shapes, sizes, and positional relationships to help the content of the disclosure to be understandable. In other words, the disclosure is not limited to the shapes, sizes and positional relationships exemplified in each of the drawings.

First Embodiment

Configuration of Microscope System

Figure 1:
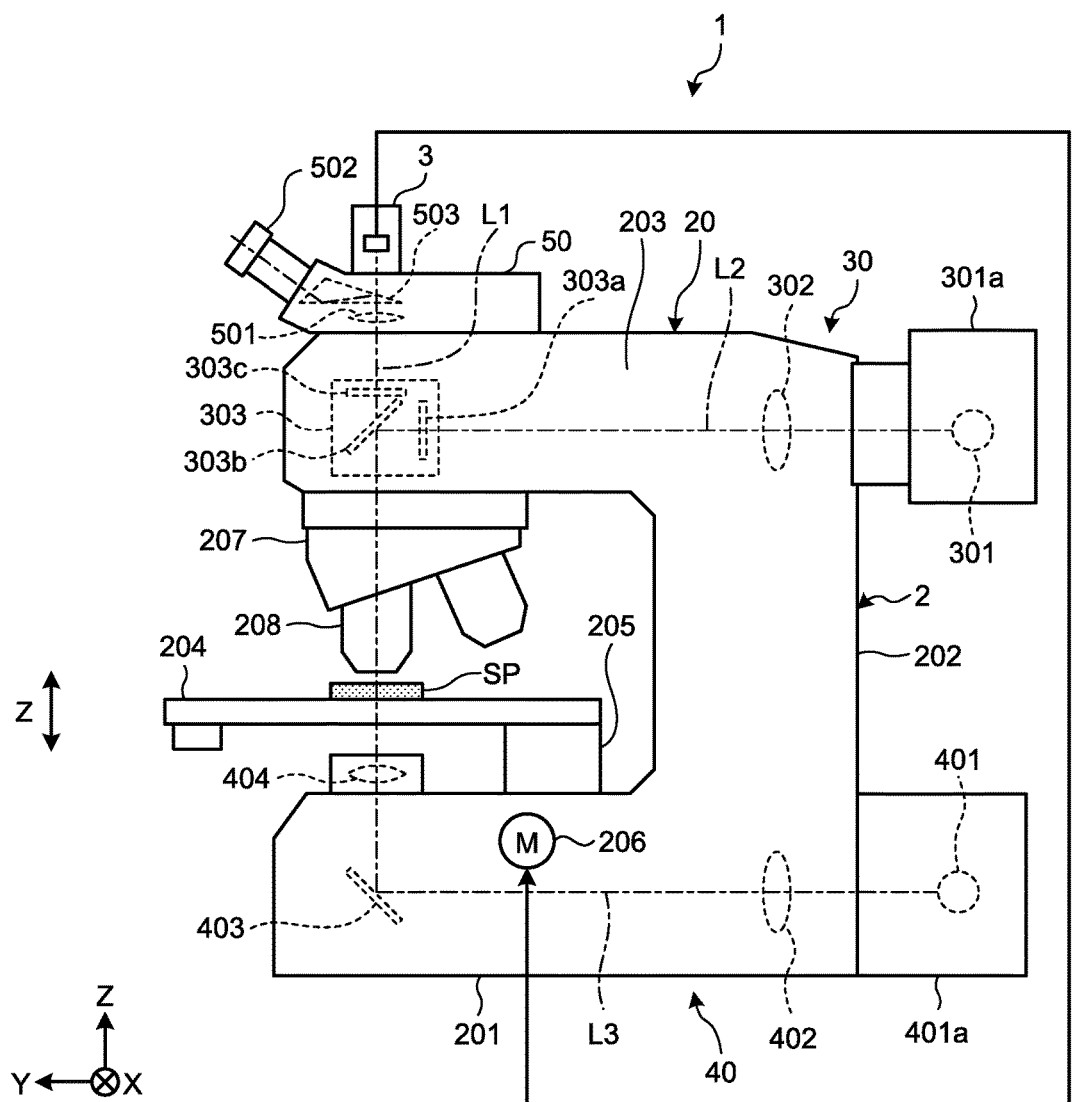
FIG. 1 is a schematic diagram illustrating an entire configuration of a microscope system according to a first embodiment of the disclosure.

FIG. 1 is a schematic diagram illustrating an entire configuration of a microscope system according to a first embodiment of the disclosure. A microscope system 1 illustrated in FIG. 1 includes a microscope 2 to observe specimen SP; an imaging device 3 that images the specimen SP via the microscope 2 and generates image data; a stage Z drive controller 4 that controls vertical movement of a stage in included the microscope 2, which will be described below; a microscope control unit 5 that controls driving the entire microscope system 1; a display device 6 that displays an image corresponding to the image data that generated by the imaging device 3; and a microscope controller 7 that receives inputs of the entire microscope system 1. In the descriptions, the front side of the microscope 2 herein refers to a side on which an observer positions and the rear side refers to a side opposed to the front side. The plane on which the microscope 2 is placed in FIG. 1 is referred to as an X-Y plane and the direction orthogonal to the X-Y plane is referred to as a Z direction.

Configuration of Microscope

First of all, a configuration of the microscope 2 will be described.

The microscope 2 includes a microscope main unit 20, an epi-illumination optical system 30, and a transmitted-light illumination optical system 40.

The microscope main unit 20 includes a base unit 201, a supporter 202 that stands on the rear side of the base unit 201, and an arm unit 203 that is supported by the supporter 202 and that extends toward the font side.

The base unit 201 is a part that is directly placed on a site, such as a desk, in which the microscope system 1 is set. The transmitted-light illumination optical system 40 is arranged in the base unit 201. On the base unit 201, a stage 204 on which a specimen SP is placed and that is movable in a direction parallel to a placement surface (X-Y plane) on which at least the microscope 2 is placed (hereinafter, the "horizontal direction") or a direction orthogonal to the placement surface (hereinafter, the "vertical direction"), an alignment unit 205 that holds the stage 204 movably in the vertical direction (Z direction), and a driver 206 that includes a DC motor and a stepping motor and that drives the alignment unit 205 to causes the stage 204 to move in the orthogonal direction are arranged. In the first embodiment, the stage 204 and the driver 206 function as an electronic stage. Needless to say, a motor, such as a stepping motor, may be further provided such that the stage 204 is automatically movable in the horizontal direction.

The supporter 202 stands on the rear side (back side) of the base unit 201 and is integrated with the base unit 201 at the bottom part.

The arm unit 203 extends toward the front side of the microscope 2 from the top end of the supporter 202 toward the front side of the microscope 2. A revolver 207 is attached to the bottom side of the arm unit 203, a lens barrel 50 is attached to the top side, and the epi-illumination optical system 30 is arranged in the arm unit 203.

The revolver 207 is rotatably held by the arm unit 203 and an objective lens 208 is arranged above the specimen SP. The objective lenses 208 having different magnifications (observation magnifications) are mounted on the revolver 207 such that they are switchable and are inserted into an observation optical path L1 according to the rotation to selectively switch the objective lens 208 used for observing the specimen SP. A motor, such as a stepping motor, may be provided such that the revolver 207 is rotatable automatically.

The epi-illumination optical system 30 applies illumination light by epi-illumination observation to the specimen SP. The epi-illumination optical system 30 at least includes an epi-illumination light source 301, an illumination lens 302 and a filter unit 303. In the epi-illumination optical system 30, the illumination lens 302 and the filter unit 303 are arranged between the epi-illumination light source 301 and the top surface of the specimen SP placed on the stage 204 in the order they appear in this sentence, thereby forming an epi-illumination optical path L2.

The epi-illumination light source 301 is housed in a lamp house 301a and the epi-illumination light source 301 is attached to the arm unit 203 via the lamp house 301a. The epi-illumination light source 301 includes, for example, an ultrahigh pressure mercury lamp, a xenon lamp, an ultraviolet LED, or the like and emits illumination light to the illumination lens 302.

The illumination lens 302 is arranged in the arm unit 203. The illumination lens 302 focuses the illumination light emitted by the epi-illumination light source 301, converts the illumination light into parallel light, and applies the parallel light to the filter unit 303.

The filter unit 303 is arranged in the arm unit 203 via a turret (not illustrated in FIG. 1). The filter unit 303 includes an excitation filter 303a, a dichroic mirror 303b and a barrier filter 303c. Multiple lenses corresponding to the optical dyes with which the specimen SP is colored are housed in the turret. Rotating the turret about a predetermined axis causes the optimal filter selectively to be inserted into the epi-illumination optical path L2 (observation light path L1). In the turret, an observation unit other than one for fluorescent observation, such as units respectively for differential interference observation, bright-field observation, phase difference observation, polarization observation, and dark-field observation are stored.

The transmitted-light illumination optical system 40 applies illumination light by transmitted-light observation to the specimen SP. In the transmitted-light illumination optical system 40 includes at least a transmitted-light illumination light source 401, an illumination lens 402, a mirror 403, and a top lens 404. In the transmitted-light illumination optical system 40, the illumination lens 402, the mirror 403 and the top lens 404 are arranged between the transmitted-light illumination light source 401 and the bottom surface of the specimen SP arranged on the stage 204 in the order they appear in this sentence, thereby forming a transmitted-light illumination light path L3.

The transmitted-light illumination light source 401 is housed in a lamp house 401a and is attached to the base unit 201 via the lamp house 401a. The transmitted-light illumination light source 401 includes, for example, a halogen lamp and a white LED. The transmitted-light illumination light source 401 emits illumination light to the illumination lens 402.

The illumination lens 402 is arranged in the base unit 201. The illumination lens 402 focuses the illumination light emitted by the transmitted-light illumination light source 401, converts the illumination light into parallel light, and applies the parallel light to the mirror 403.

The mirror 403 is arranged in the base unit 201 and reflects the illumination light from the illumination lens 402 to the top lens 404.

The top lens 404 applies the illumination light reflected from the mirror 403 to the specimen SP.

The lens barrel 50 includes a tube lens 501 that forms a specimen image of the specimen SP and an optical path switch prism 503 that leads the optical path of an observation light to an eyepiece 502 and to the imaging device 3. The observation image of the specimen SP formed by the tube lens 501 is led by the optical path switch prism 503 into the eyepiece 502 and is observed visually by the observer via the eyepiece 502.

Configuration of Imaging Device

A configuration of the imaging device 3 will be described.

Under the control of the microscope control unit 5, the imaging device 3 captures an observation image of the specimen SP that is led by the optical path switch prism 503 and generates imaged data of the specimen SP. The image data generated by the imaging device 3 is output to the microscope control unit 5, which will be described below.

Configuration of Stage Z Drive Controller

A configuration of the stage Z drive controller 4 will be described.

The stage Z drive controller 4 drives the driver 206 under the control of the microscope control unit 5. The stage Z drive controller 4 includes, for example, a central processing unit (CPU) and a non-volatile memory.

Configuration of Microscope Control Unit

A configuration of the microscope control unit 5 will be described.

The microscope control unit 5 controls each of the units forming the microscope system 1. The microscope control unit 5 includes, for example, a CPU and a non-volatile memory.

Configuration of Display Device

The configuration of the display device 6 will be described.

Under the control of the microscope control unit 5, the display device 6 displays an image corresponding to the image data that is generated by the imaging device 3. The display device 6 includes, for example, a liquid crystal or organic electro luminescence (EL) display panel.

Configuration of Microscope Controller

A configuration of the microscope controller 7 will be described.

Figure 2:
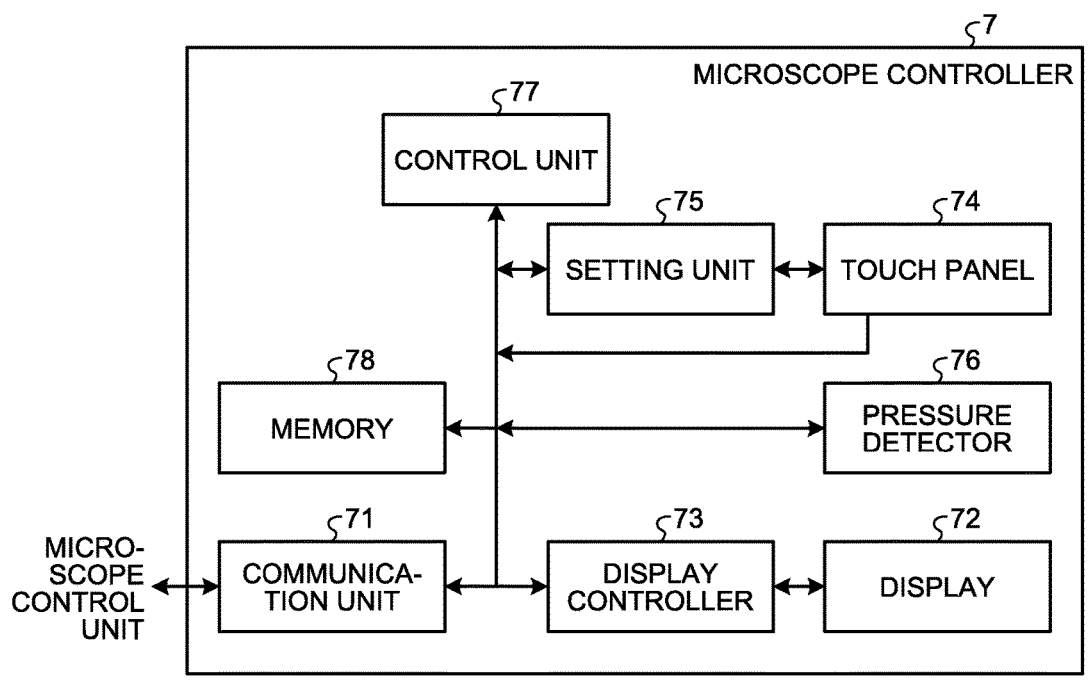
FIG. 2 is a block diagram illustrating a functional configuration of a microscope controller according to the first embodiment of the disclosure.

FIG. 2 is a block diagram illustrating a functional configuration of the microscope controller 7. As illustrated in FIG. 2, the microscope controller 7 includes a communication unit 71, a display 72, a display controller 73, a touch panel 74, a setting unit 75, a pressure detector 76, a control unit 77, and a memory 78.

Under the control of the control unit 77, the communication unit 71 receives an input of an instruction signal from the microscope control unit 5 and the microscope controller 7 outputs various types of operation content corresponding to the received input to the microscope control unit 5.

The display 72 displays an operation screen that functions as a user interface for receiving various types of input signals executable by the microscope system 1. The display 72 includes, for example, a liquid crystal or organic electro luminescence (EL) display panel. Details of the operation screen displayed by the display 72 will be described below.

The display controller 73 controls a display mode of the display 72. The display controller 73 includes, for example, a central processing unit (CPU). The display controller 73 reads a program relating to a user interface that is recorded in the memory 78 and causes the display 72 to make a display.

The touch panel 71 is provided on a display area of the display 72 in a superimposed manner. The touch panel 74 detects a contact position in which an object from outside contacts the touch panel 74 and outputs a position signal about the contact position (a signal indicating X and Y coordinates) to the control unit 77.

Under the control of the control unit 77, the setting unit 75 sets areas corresponding respectively to multiple operation functions for driving multiple electronic units included in the microscope 2 in an allocated manner in a detection area of the touch panel 74. The detection area of the touch panel 74 where the setting unit 75 makes a setting will be described below.

The pressure detector 76 is provided between the touch panel 74 and the display 72 or in the touch panel 74. The pressure detector 76 detects the value of the pressure applied in a position of contact in which an object from outside contacts the touch panel 74 and outputs the pressure value to the control unit 77. The pressure detector 76 includes, for example, a pressure sensor or a capacitive sensor. The order in which the touch panel 74 and the pressure detector 76 are superimposed may be changed as appropriate.

The control unit 77 includes, for example, a CPU and controls each unit of the microscope controller 7. On the basis of a position of contact (input point) detected by the touch panel on the operation display area displayed by the display 72, the number of positions of contact (the number of input points), a change of the position of contact over time (the mode of move of the input point that changes over time) and the pressure value in the point of contact, the control unit 77 generates an instruction signal of an instruction to change an observation status in which the specimen SP is observed with an electronic unit corresponding to the operation function that is set by the setting unit 75 and then outputs the instruction signal to the microscope control unit 5. In the first embodiment, the control unit 77 functions as a drive controller.

In the memory 78, action information about action control in the microscope system 1 corresponding to the input received by the microscope controller 7 is recorded. The memory 78 includes, for example, a non-volatile memory and a volatile memory. The action information recorded by the memory 78 will be described below.

Details of Operation Screen

The detail of the operation screen displayed by the display 72 will be described.

FIG. 3 is a diagram schematically illustrating an exemplary operation screen displayed by the display 72. As illustrated in FIG. 3, the setting unit 75 sets, in the detection area of the touch panel 74 on the operation screen M1, an area a1 where operational inputs to move the stage 204 upward (a plus direction button B1) are received, an area a2 where operational inputs to move the stage 204 downward (a minus direction button B2) are received, an area a3 where operational inputs to move the stage 204 in the X and Y directions are received, and an area a4 where inputs of observation methods of the microscope 2 are received, an area a5 where inputs about the filter unit 303 and the brightness of the light source are received, an area a6 where inputs about the observation magnification are received, an area a7 where inputs about, for example, imaging by the imaging device 3 and the shutter speed are received, an area a8 where inputs about the focus by the microscope 2 are received, and an area a9 where inputs about guides of various types of operations are received.

Details of Action Information

Details of the action information recorded in the memory 78 will be described.

FIG. 4A is a diagram illustrating action information that is recorded in the memory 78. FIG. 4B is a diagram illustrating other exemplary information recorded in the memory 78. FIG. 4C is a diagram illustrating still other exemplary action information recorded in the memory 78.

In action information T1 to T3 illustrated in FIGS. 4A to 4C, actions of the microscope system 1, actions taken when areas where pressures are detectable in the operation screen M1 are operated, and actions taken when the areas where pressures are detectable in the operation screen M1 are described, respectively. Specifically, in the case of the action information T1 illustrated in FIG. 4A, the action is control on the Z coordinate of the alignment unit 205. While the control unit 77 outputs an instruction signal to increase the moving speed at which the stage 204 is lowered (an instruction signal to move the stage 204 coarsely) when the minus direction button B2 in the area a2 is pressed and the pressure value detected by the pressure detector 76 is equal to or larger than a threshold, the control unit 77 outputs an instruction signal to reduce the moving speed at which the stage 204 is lowered (an instruction signal to move the stage 204 finely) when the pressure value detected by the pressure detector 76 is smaller than the threshold. As described above, the control unit 77 determines the action mode of the microscope system 1 on the basis of the contact position that is detected by the touch panel 74 and the pressure value that is detected by the pressure detector 76 and with reference to the action information recorded in the memory 78 and, according to the action mode, generates an instruction signal to control driving each electronic unit.

Process of Microscope System

Figure 5:
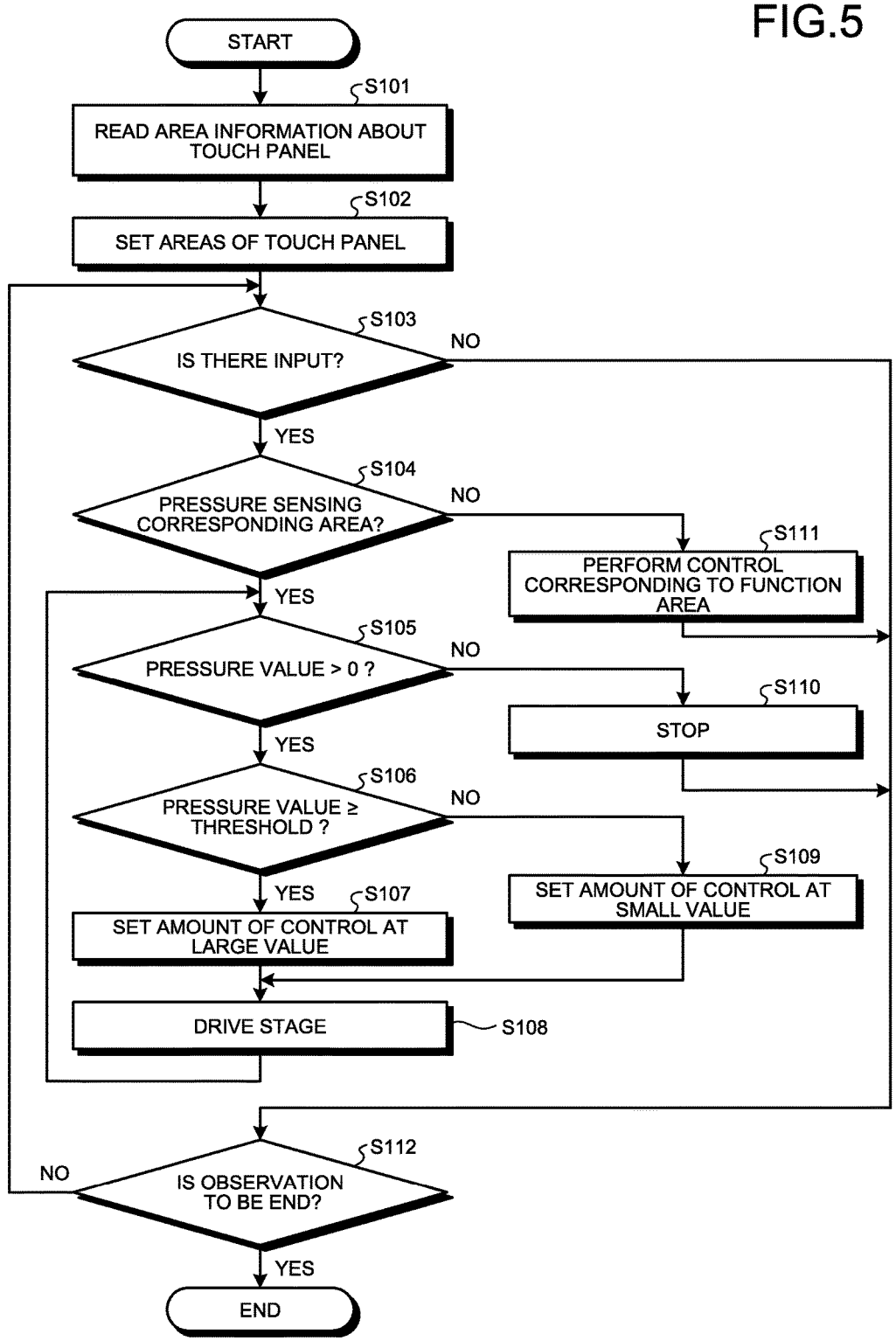
FIG. 5 is a flowchart illustrating an overview of a process that is executed by the microscope system according to the first embodiment of the disclosure.

A process executed by the microscope system 1 will be described. FIG. 5 is a flowchart illustrating an overview of the process executed by the microscope system 1. FIG. 5 illustrates driving the stage 204 as an example, and the microscope system 1 performs the processes corresponding to the action modes illustrated in FIGS. 4A to 4C described above on the basis of the contact positions in each of which the user performs pressing (hereinafter, "touch positions"), changes of the contact positions over time (referred to as the "tracks of the touch positions"), and the pressure values.

As illustrated in FIG. 5, first of all, the control unit 77 reads area information for microscope operations from the memory 78 (step S101) and sets the operation screen M1 and touch areas of the touch panel 74 (step S102). Specifically, the control unit 77 causes the display 72 to display the above-described operation screen M1 illustrated in FIG. 3 via the display controller 73 and sets areas corresponding respectively to the multiple operation functions for driving the electronic units of the microscope system 1 in an allocated manner in the touch area of the touch panel 74 via the setting unit 75.

Subsequently, when there is an input to the touch panel 74 (YES at step S103), the microscope system 1 moves to step S104, which will be described below. On the other hand, when there is no input to the touch panel 74 (NO at step S103), the microscope system 1 moves to step S112, which will be described below.

At step S104, the control unit 77 determines whether the touch position in which the input to the touch panel 74 is made is a pressure sensing corresponding area. Specifically, when the control unit 77 determines whether the touch position in which the input to the touch panel 74 is made is in the area a1 (the plus direction button B1) or the area a2 (the minus direction button B1) that is the pressure sensing corresponding area. When the control unit 77 determines that the touch position in which the input to the touch panel 74 is made is in the pressure sensing corresponding area (YES at step S104), the microscope system 1 moves to step S105, which will be described below. On the other hand, when the control unit 77 determines that the touch position in which the input to the touch panel 74 is made is not in the pressure sensing corresponding area (NO at step S104), the microscope system 1 moves to step S111, which will be described below.

At step S105, when the pressure value detected by the pressure detector 76 exceeds 0 (YES at step S105) and the pressure value detected by the pressure detector 76 is equal to or larger than the threshold (the pressure value≥the threshold) (YES at step S106), the control unit 77 sets the amount of control on the stage 204 at a large value (at a high moving speed) (step S107) and outputs the amount of control to the microscope control unit 5 via the communication unit 71, thereby driving the stage 204 (step S108). Accordingly, the observer is able to coarsely move the stage 204 by performing pressing strongly and thus, when the amount by which the stage 204 is caused to be moved is large, it is possible to promptly move the stage 204 to a desired position. After step S108, the microscope system 1 returns to step S105.

When the pressure value detected by the pressure detector 76 exceeds 0 at step S105 (YES at step S105) and the pressure value detected by the pressure detector 76 is smaller than the threshold (the pressure value<the threshold) (NO at step S106), the control unit 77 sets the amount of control on the stage 204 at a small value (at a low moving speed) (step S109). Accordingly, the observer is able to finely move the stage 204 by performing pressing lightly and thus, when the amount by which the stage 204 is caused to be moved is small, it is possible to make a fine adjustment easily on the move to a desired position. After step S109, the microscope system 1 moves to step S108.

When the pressure value detected by the pressure detector 76 at step S105 is equal to or smaller than 0 (NO at step S105), the control unit 77 outputs an instruction signal for instructing the microscope control unit 5 to stop the stage 204 via the communication unit 71, thereby stopping driving the stage 204 (step S110). After step S110, the microscope system 1 moves to step S112, which will be described below.

At step S111, the control unit 77 outputs an instruction signal corresponding to a function area corresponding to the touch position in which the input to the touch panel 74 is made to the microscope control unit 5 via the communication unit 71. For example, when the function area corresponding to the touch position in which the input to the touch panel 74 is made is the area a4, the control unit 77 outputs an instruction signal to switch the observation method to one corresponding to the touch position in which the input to the touch panel 74 is made to the microscope control unit 5 via the communication unit 71. Accordingly, the microscope control unit 5 changes the observation method by, for example, changing the filter unit 303 to another filter unit 303. After step S111, the microscope system 1 moves to step S112, which will be described below.

When an instruction signal of an instruction to end the observation is input at step S112 (YES at step S112), the microscope system 1 ends the process. On the other hand, the instruction signal of an instruction to end the observation is not input (NO at step S112), the microscope system 1 returns to step S103.

According to the above-described first embodiment of the disclosure, the control unit 77 generates an instruction signal of an instruction to change the observation status in which the specimen SP is observed with the stage 204 and that corresponds to the operation function corresponding to the touch position that is set by the setting unit 75 on the basis of the touch position detected by the touch panel 74 and the pressure value that is detected by the pressure detector 76 and then outputs the instruction signal to the microscope control unit 5, which makes it possible to improve operability of the microscope 2.

Second Embodiment

The second embodiment of the disclosure will be described. The configuration according to the second embodiment is different from that of the microscope system 1 according to the first embodiment and the process to be executed according to the second embodiment is different from that of the first embodiment. Specifically, in the above-described first embodiment, when a touch position on the touch panel 74 is in the pressure sensing corresponding area, the amount of control to drive the driver of the microscope 2 is switched according to the pressure value. On the other hand, in the second embodiment, the amount of control to drive the driver of the microscope 2 is switched according to the pressure value that varies according to the track of the touch position on the touch panel. A configuration of a microscope system according to the second embodiment will be described below and then the process executed by the microscope system according to the second embodiment will be described. The same components as those of the microscope system 1 according to the above-described first embodiment will be denoted with the same reference numbers as those of the first embodiment and descriptions thereof will be omitted.

Configuration of Microscope System

Figure 6:
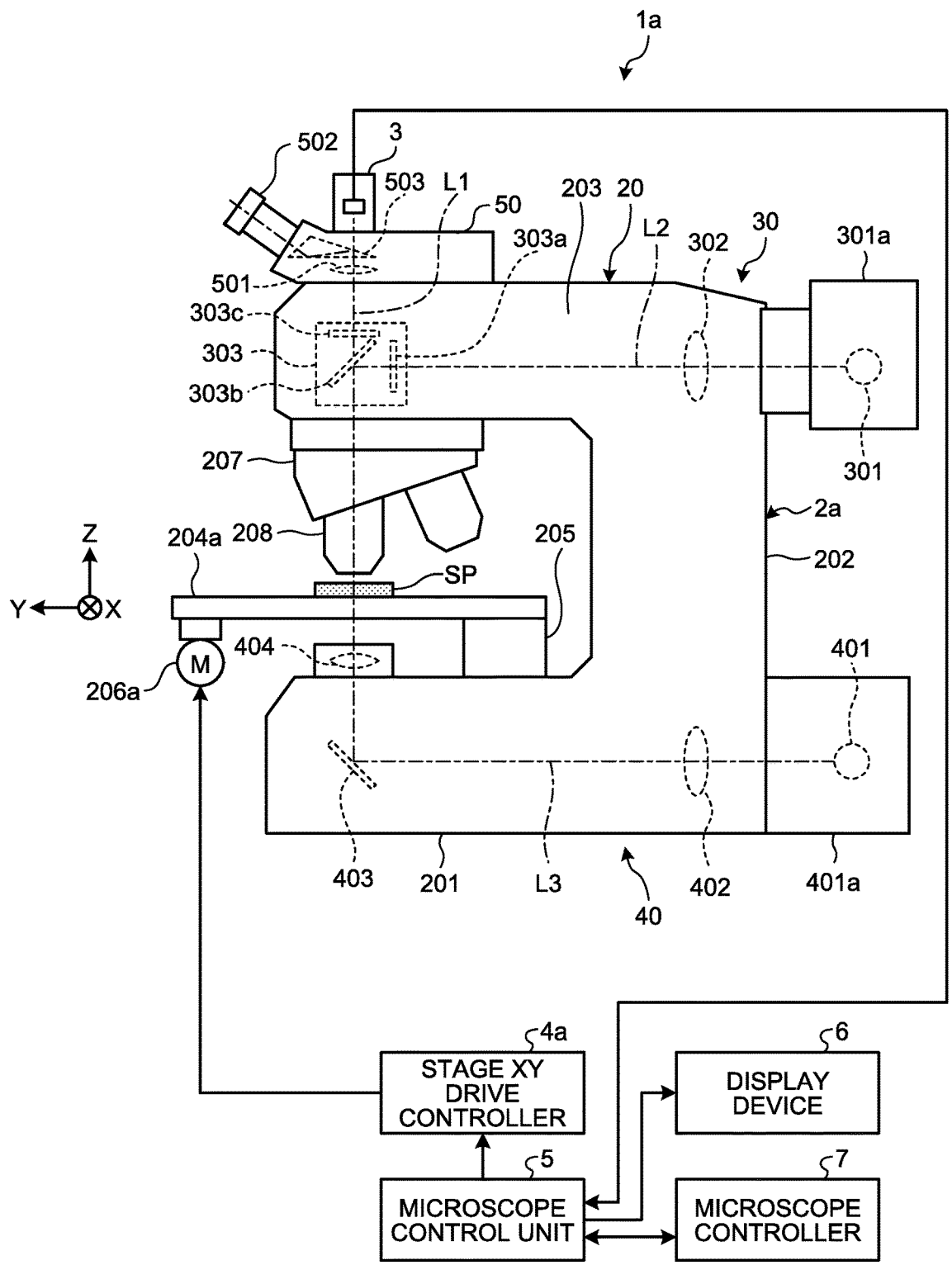
FIG. 6 is a schematic diagram illustrating an entire configuration of a microscope system according to a second embodiment of the disclosure.

FIG. 6 is a schematic diagram illustrating an entire configuration of the microscope system according to the second embodiment of the disclosure. A microscope system 1a illustrated in FIG. 6 includes a microscope 2a and a stage XY drive controller 4a instead of the microscope 2 and the stage Z drive controller 4 of the microscope system 1 according to the above-described first embodiment.

Configuration of Microscope

A configuration of the microscope 2a will be described.
The microscope 2a includes a stage 204a and a driver 206a instead of the stage 204 and the driver 206 of the microscope 2 according to the first embodiment.

The stage 204a is held by the alignment unit 205 movably in the horizontal direction (X and Y directions). Under the control of the stage XY drive controller 4a, the driver 206a moves the stage 204a horizontally. The driver 206a includes, for example, a DC motor, a pulse motor or a stepping motor.

Configuration of Stage XY Drive Controller

A configuration of the stage XY drive controller 4a will be described.
The stage XY drive controller 4a drives the driver 206a under the control of the microscope control unit 5. The stage XY drive controller 4a includes, for example, CPU and a non-volatile memory.

Details of Action Information

Action information recorded by the memory 78 of the microscope controller 7 according to the second embodiment be described. FIG. 7 is a diagram illustrating exemplary action information recorded in the memory 78.

In action information T10 illustrated in FIG. 7 actions of the microscope system 1a, actions taken when the area a3 in the operation screen M1 is operated are described. Specifically, according to the action information T10 illustrated in FIG. 7, in the case where the action is driving the stage in the X and Y directions, while the control unit 77 outputs an instruction signal to drive the stage (to cause the stage to move coarsely), following dragging (the track of a touch) in the area a3, when the pressure value detected by the pressure detector 76 is equal to or larger than a threshold, the control unit 77 outputs an instruction signal to drive the stage (to cause the stage to move finely), following dragging in the area a3 when the pressure value detected by the pressure detector 76 is smaller than the threshold. The pressure values of the dragging detected by the pressure detector 76 is any one of the average of or the maximum value among the pressure values within the time until separation of the touch from the touch panel 74 from a touch start position in which the first touch on the touch panel 74 is made. The pressure value that is detected by the pressure detector 76 in the dragging may be the pressure value in the touch position in which the touch panel 74 is touched for the first time. As described above, on the basis of the touch position detected by the touch panel 74, the track of touch (the mode of move of the touch position that varies over time), and the pressure value that is detected by the pressure detector 76, the control unit 77 determines the action mode of the microscope system 1a with reference to the action information T10 recorded in the memory 78 and, according to the action mode, generates an instruction signal to control driving each electronic unit.

Process of Microscope System

Figure 8:
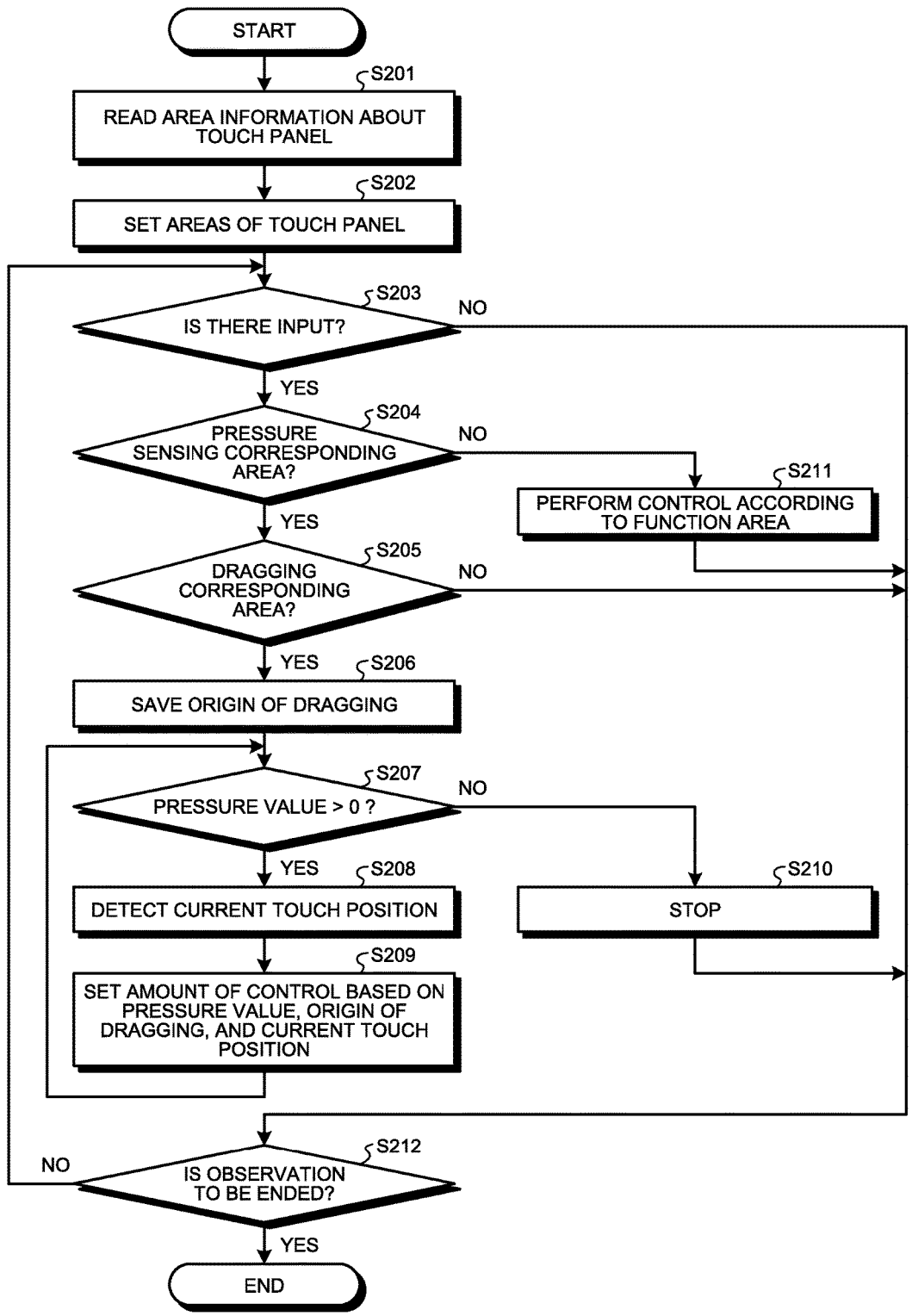
FIG. 8 is a flowchart illustrating an overview of a process that is executed by the microscope system according to the second embodiment of the disclosure.

A process executed by the microscope system 1a will be described. FIG. 8 is a flowchart illustrating an overview of the process executed by the microscope system 1a. FIG. 8 illustrates driving the stage 204a as an example, and the microscope system 1a performs the processes corresponding to the above-described action modes illustrated in FIG. 7 on the basis of the touch positions in each of which the user performs pressing, the tracks of the touches, and the pressure values. Steps S201 to step S204, step S211 and step S212 in FIG. 8 correspond respectively to the above-described steps S101 to step S104, step S111 and step S112 illustrated in FIG. 5 and descriptions thereof will be omitted.

At step S205, the control unit 77 determines whether a touch position in which an input to the touch panel 74 is made is in a dragging corresponding area. Specifically, the control unit 77 determines whether the touch position in which the input to the touch panel 74 is made is in the area a3 that is the dragging corresponding area a3 (see FIG. 3).

When the control unit 77 determines that the touch position in which the input to the touch panel 74 is made is in the dragging corresponding area (YES at step S205), the microscope system 1a moves to step S206 to be described below. On the other hand, when the control unit 77 determines that the touch position in which the input to the touch panel 74 is made is not in the dragging corresponding area (NO at step S205), the microscope system 1a moves to step S212.

At step S206, the control unit 77 records the touch position in which the input to the touch panel 74 is made in the memory 78 as an origin of the dragging (the first touch position).

Subsequently, when the pressure value detected by the pressure detector 76 exceeds 0 (YES at step S207), the control unit 77 acquires the current touch position of the dragging operation from the touch panel 74 (step S208) and sets an amount of control on the stage 204a on the basis of the pressure value that is detected by the pressure detector 76 and the mode of move of the dragging based on the current touch position in the dragging (step S209). For example, when the pressure value detected by the pressure detector 76 is equal to or larger than a threshold, the control unit 77 determines an amount of control to drive the stage 204a to cause the stage 204a to move coarsely according to the track of the touch position and outputs the amount of control to the microscope control unit 5 via the communication unit 71. After step S209, the microscope system 1a returns to the above-described step S207.

At step S207, when the pressure value detected by the pressure detector 76 is equal to or smaller than 0 (NO at step S207), the control unit 77 stops driving the stage 204a by outputting an instruction signal to instruct the microscope control unit 5 to stop the stage 204a via the communication unit 71, thereby stopping driving the stage 204a (step S210). After step S210, the microscope system 1a moves to step S212 to be described below.

According to the second embodiment of the disclosure, on the basis of the touch position that is detected by the touch panel 74, the track of the touch, and the pressure value that is detected by the pressure detector 76, the control unit 77 generates an instruction signal of an instruction to change the observation status in which the specimen SP is observed with the stage 204 corresponding to the operation function corresponding to the touch position that is set by the setting unit 75 and outputs the instruction signal to the microscope control unit 5, which makes it possible to improve the operability of the microscope 2.

Third Embodiment

The third embodiment of the disclosure will be described. The configuration of third embodiment is the same as that of the microscope system 1 according to the first embodiment but action information recorded in the memory 78 of the microscope controller 7 and a process to be executed according to the third embodiment are different from those of the first embodiment. Specifically, in the third embodiment, an amount of control to drive the driver of the microscope 2 is set on the basis of the pressure values at two points of the touch panel. Action information recorded in the memory of the microscope controller according to the third embodiment will be described below and then the process to be executed by the microscope system according to the third embodiment will be described. The same components as those of the microscope system 1 according to the above-described first embodiment will be debited with the same reference numbers as those of the first embodiment and thus descriptions thereof will be omitted.

Details of Action Information

The action information recorded in the memory 78 of the microscope controller 7 according to the third embodiment will be described. FIG. 9 is a diagram illustrating exemplary action information recorded in the memory 78.

In the action information T20 illustrated in FIG. 9, actions of the microscope system 1 and actions taken when the area a3 on the operation screen M1 is operated are described. Specifically, according to the action information T20 illustrated in FIG. 9, in the case where the action is controlling the stage in the Z direction, while the control unit 77 outputs an instruction signal to elevate the stage 204 when the pressure value in a point $\alpha$ is larger than the pressure value at a point $\beta$, the control unit 77 outputs an instruction signal to lower the stage 204 when the pressure value in the point $\alpha$ is smaller than the pressure value in the point $\beta$. As described above, the control unit 77 determines the action mode of the microscope system 1 with reference to the action information T20 recorded in the memory 78 on the basis of the pressure values in the two points on the touch panel 74 that are detected by the pressure detector 76 and, according to the action mode, generates an instruction signal to control driving each electronic unit.

Process of Microscope System

Figure 10:
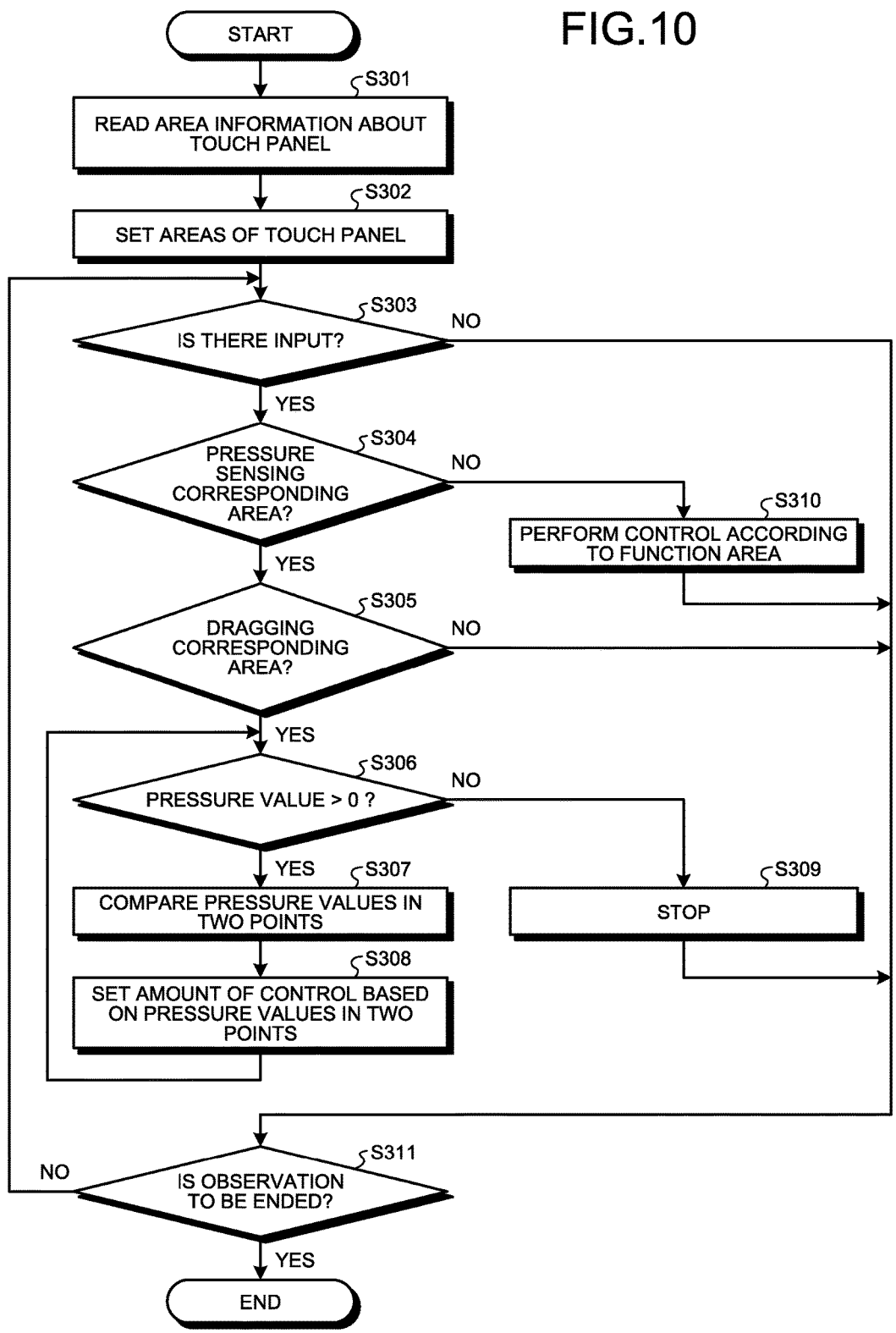
FIG. 10 is a flowchart illustrating an overview of a process that is executed by a microscope system according to the third embodiment of the disclosure.

A process executed by the microscope system 1 will be described. FIG. 10 is a flowchart illustrating an overview of the process executed by the microscope system 1. FIG. 10 illustrates driving the stage 204 as an example, and the microscope system 1 performs the process corresponding to the above-described action mode illustrated in FIG. 9 on the basis of the multiple touch positions in each of which the user performs pressing and the pressure values in the respective touch positions. Steps S301 to S304 and steps S309 to S311 in FIG. 10 correspond respectively to steps S101 to S104 and steps S110 to S112 in FIG. 5 described above and thus descriptions thereof will be omitted.

At step S305, the control unit 77 determines whether the touch positions in which the inputs to the touch panel 74 are made are in the dragging corresponding area. Specifically, the control unit 77 determines whether the touch positions in which the inputs to the touch panel 74 are made are in the area a3 (see FIG. 3) that is the dragging corresponding area. When the control unit 77 determines that the touch positions in which the inputs to the touch panel 74 are made are in the dragging corresponding area (YES at step S305), the microscope system 1 moves to step S306, which will be described below. On the other hand, when the control unit 77 determines that the touch positions in which input to the touch panel 74 are made are not in the dragging corresponding area (NO at step S305), the microscope system 1 moves to step S311.

At step S306, when the pressure values in two points detected by the pressure detector 76 exceeds 0 (YES at step S306), the control unit 77 compares the pressure values in the different two touch positions from the touch panel 74 (step S307) and sets an amount of control from the pressure values in the two touch positions (step S308). For example, when the pressure value in the point $\alpha$ detected by the pressure detector 76 is larger than the pressure value in the point $\beta$, the control unit 77 outputs an instruction signal to elevate the stage 204 to the microscope control unit 5 via the communication unit 71. After step S308, the microscope system 1 returns to the above-described step S306.

When the pressure values in the two points detected by the pressure detector 76 are equal to or smaller than 0 at step S306 (NO at step S306), the microscope system 1 moves to step S309.

According to the above-described third embodiment of the disclosure, in the case where the touch panel 74 detects positions of contact of multiple objects, on the basis of the maximum pressure value among the pressure values detected by the pressure detector 76, the control unit 77 generates an instruction signal of an instruction to change the observation mode in which the specimen SP is observed with the stage 204 corresponding to the operation function corresponding to the contact positions set by the setting unit 75 and outputs the instruction signal to the microscope control unit 5, which makes it possible to improve the operability of the microscope 2.

Fourth Embodiment

A fourth embodiment of the disclosure will be described. The configuration according to the fourth embodiment is the same as that of the microscope system 1 according to the first embodiment and action information that is recorded in the memory 78 of the microscope controller 7 according to the fourth embodiment is different from that of the first embodiment and the process to be executed by the microscope system is also different from that of the first embodiment. Specifically, in the fourth embodiment, an amount of control to drive the driver of the microscope 2 is set on the basis of a dragging of any one of touch operations in two points that are different from each other and the value of the pressure applied by the dragging. The operation information that is recorded in the memory according to the fourth embodiment will be described and then the process to be executed by the microscope system according to the fourth embodiment will be described. The same components as those of the microscope system 1 according to the above-described first embodiment are denoted with the same reference numbers as those of the above-described microscope system 1 according to the first embodiment and descriptions thereof will be omitted.

Details of Action Information

Action information recorded in the memory 78 of the microscope controller 7 according to the fourth embodiment will be described. FIG. 11 is a diagram illustrating exemplary action information recorded in the memory 78.

In action information T30 illustrated in FIG. 11, actions of the microscope system 1, the content of touch operations, the content of touch operations in the area a3 in the operation screen M1, and actions taken when the buttons are pressed are described. Specifically, according to the action information T30 illustrated in FIG. 11, the case where the action is controlling the stage in the Z direction, when the touch operations in two points where the left-side touch operation of the touch operations is being fixed and the right-side touch operation of the touch operations is up-down dragging are performed, the control unit 77 determines the direction in which the stage 204 is to be moved according to the direction of the dragging of the right-side touch operation and, on the basis of comparison between a threshold and the value of pressure applied when the dragging of the right-side touch operation is performed, determines an amount by which the stage 204 is caused to be moved and outputs an instruction signal.

Process of Microscope System

Figure 12:
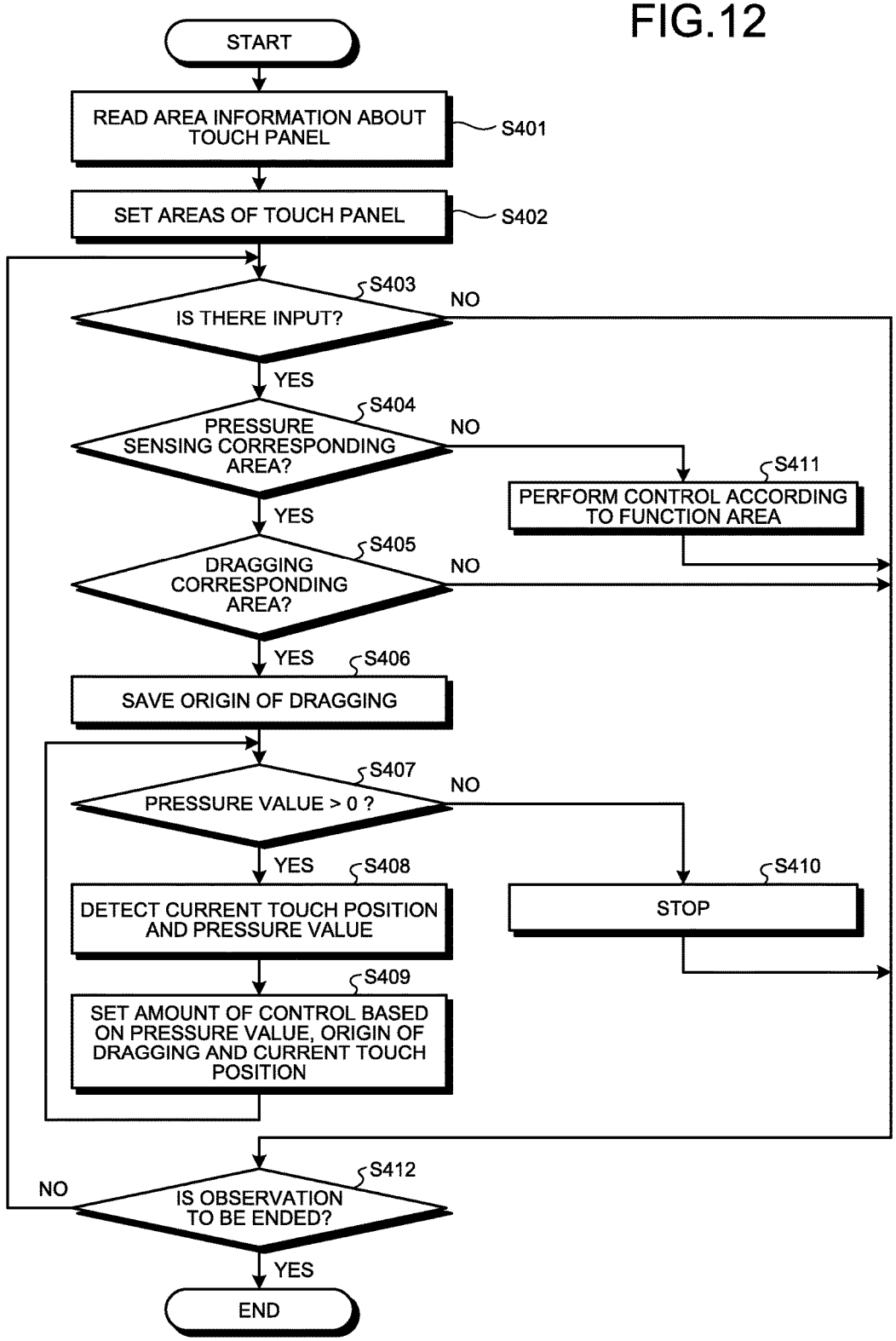
FIG. 12 is a flowchart illustrating an overview of a process that is executed by a microscope system according to the fourth embodiment of the disclosure.

A process executed by the microscope system 1 will be described. FIG. 12 is a flowchart illustrating an overview of the process executed by the microscope system 1. FIG. 12 illustrates driving the stage 204 as an example, and the microscope system 1 performs the processes corresponding to the above-described action modes illustrated in FIG. 11 on the basis of multiple touch positions in each of which the user performs pressing and the pressure values of the respective touch positions. Steps S401 to S404, step S411 and step S412 in FIG. 12 correspond respectively to steps S101 to S104, step S111 and step S112 and thus descriptions thereof will be omitted.

At step S405, the control unit 77 determines whether the touch positions in which inputs to the touch panel 74 are made are in the dragging corresponding area. When the control unit 77 determines that the touch positions in which inputs to the touch panel 74 are made are in the dragging corresponding area (YES at step S405), the microscope system 1 moves to step S406, which will be described below. On the other hand, when the control unit 77 determines that the touch positions in which the inputs to the touch panel 74 are made are not in the dragging corresponding area (NO at step S405), the microscope system 1 moves to step S412.

At step S406, the control unit 77 records the touch positions in which the inputs to the touch panel 74 are made in the memory 78 as the origin of the dragging.

Subsequently, when the pressure value detected by the pressure detector 76 exceeds 0 (YES at step S407), the control unit 77 acquires, from the touch panel 74, the current touch position detected by the touch panel 74 and the pressure value that is detected by the pressure detector 76 (step S408).

The control unit 77 then sets an amount of control on the stage 204 in the Z direction on the basis of the pressure value that is detected by the pressure detector 76, the origin of the dragging detected by the touch panel 74, and the current position (step S409). For example, when the pressure value detected by the pressure detector 76 is equal to or larger than the threshold, the control unit 77 determines an amount of control to drive the stage 204 to move the stage 204 coarsely according to the track of the touch position and output the amount of control to the microscope control unit 5 via the communication unit 71. After step S409, the microscope system 1 moves to step S407.

At step S407, when the pressure value detected by the pressure detector 76 does not exceed 0 (NO at step S407), the control unit 77 outputs an instruction signal to instructs the microscope control unit 5 to stop the stage 204 via the communication unit 71, thereby stopping driving the stage 204 (step S410). After step S410, the microscope system 1 moves to step S412.

According to the fourth embodiment, in the case where the touch panel 74 detects positions of contact of multiple objects, when at least any one of the positions in which the objects contacts the touch panel 74 moves over time, the control unit 77 generates an instruction signal of an instruction to change the observation status in which the specimen SP is observed with the stage 204 corresponding to the operation function corresponding to the touch position that is set by the setting unit 75 on the basis of the track of the touch detected by the touch panel 74 and the pressure value that is detected by the pressure detector 76 and outputs the instruction signal to the microscope control unit 5, which makes it possible to improve the operability of the microscope 2.

Other Embodiments

In the first to fourth embodiments, the stages 204 and 204a are described as exemplary electronic units. Alternatively, for example, the revolver 207 and the filter unit 303 may be used as electronic units. Furthermore, the display controller 73 may control the mode of displaying the operation information displayed by the display 72 on the basis of the touch position detected by the touch panel 74, the number of touch positions, the track of the touch position, and the pressure value detected by the pressure detector 76. For example, when the display 72 displays an image corresponding to the image data that is generated by the imaging device 3, the display controller 73 may increase or reduce the area in which the image displayed by the display 72 is displayed or control, for example, the move of the observation area imaged by the imaging device 3 and the magnification (trimming rate) on the basis of the touch position detected by the touch panel 74, the number of touch positions, the track of the touch position and the pressure value detected by the pressure detector 76.

In the descriptions of the flowcharts herein, expressions such as, "first of all", "then" and "subsequently", are used to explicitly represent the context of process among steps; however, the order of processes required to carry out the disclosure is not uniquely determined by those expressions. In other words, the order of the processes in the flowcharts herein may be changed as long as no inconsistency is caused.

The disclosure is not limited to the first to fourth embodiments. Various types of disclosure may be formed by properly combining multiple components among those disclosed in each embodiment or each modification. For example, an invention may be formed by excluding some components from all the components disclosed in each embodiment or each modification or may be formed by properly combining components of embodiments and modifications that are different from one another.

According to an aspect of the embodiments, an effect that it is possible to improve operability of the microscope is achieved.

Additional advantages and modifications will readily occur to those skilled in the art. Therefore, the disclosure in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A microscope system comprising:
   a microscope provided with a plurality of electronic units and configured to drive each of the electronic units to observe a specimen;
   a display configured to display operation information for driving each of the electronic units;
   a touch panel superimposed on a display area of the display and configured to detect a position of contact of an object from outside and receive an input of a position signal corresponding to the position of contact;
   a setting unit configured to set areas corresponding respectively to multiple operation functions for driving the electronic units in an allocated manner in a detection area of the touch panel;
   a pressure detector provided between the display and the touch panel and configured to detect a pressure value of a pressure applied in the position of contact when the object contacts the touch panel, the pressure value detected by the pressure detector identifying one of at least three statuses; and
   a drive controller configured to:
      generate, based on the position of contact that is detected by the touch panel, a number of positions of contact, a change of the position of contact over time, and the pressure value detected by the pressure detector, an instruction signal of an instruction to change an observation status in which the specimen is observed with an electronic unit, from among the plurality of electronic units, corresponding to an operation function that is set by the setting unit; and
      output the instruction signal to the microscope,
   wherein the plurality of electronic units include an electronic stage including:
      a stage on which the specimen is placed, the stage being configured to move in at least a direction parallel to a surface on which the microscope is placed; and
      a driver configured to cause the stage to move in the direction parallel to the surface, and
   wherein when the position of contact changes over time, the drive controller is configured to:
      determine a driving amount of the electronic stage and a direction in which the electronic stage is moved, based on a track of the position of contact which changes over time and the pressure value detected by the pressure detector, the driving amount being one of two or more non-zero values corresponding respectively to two of the at least three statuses; and
      output the driving amount and the direction as the instruction signal to the microscope.

2. The microscope system according to claim 1, wherein when the number of positions of contact is one, the drive controller is configured to:
   determine a driving amount of the electronic unit based on the pressure value detected by the pressure detector; and
   output the driving amount as the instruction signal to the microscope.

3. The microscope system according to claim 1, wherein when the touch panel detects positions of contact of multiple objects, the drive controller is configured to:
   determine a driving amount of the electronic unit based on a maximum value among multiple pressure values that are detected by the pressure detector; and
   output the driving amount as the instruction signal to the microscope.

4. The microscope system according to claim 1, wherein in a case where the touch panel detects positions of contact of multiple objects and at least one of the positions of contact of the objects changes over time, the drive controller is configured to:
   determine the driving amount of the electronic stage and the direction in which the electronic stage is moved, based on the track of the position of contact which changes over time and the pressure value in the position of contact which changes over time; and
   output the driving amount and the direction as the instruction signal to the microscope.

5. The microscope system according to claim 1, further comprising a display controller configured to control, based on the position of contact detected by the touch panel, the number of positions of contact, the change of the position of contact over time, and the pressure value detected by the pressure detector, a mode of displaying operation information displayed by the display.

6. The microscope system according to claim 2, wherein:
the stage is further configured to move in a direction orthogonal to the surface on which the microscope is placed;
the driver is further configured to cause the stage to move in the direction orthogonal to the surface; and
the drive controller is configured to determine a driving amount corresponding to an amount by which the stage is caused to move by the driver in the direction orthogonal to the surface.

* * * * *